United States Patent [19]

Iketani et al.

[11] Patent Number: 5,278,706
[45] Date of Patent: Jan. 11, 1994

[54] DIGITAL VIDEO SIGNAL RECORDING/REPRODUCING APPARATUS

[75] Inventors: Akira Iketani, Higashiosaka; Chojuro Yamamitsu; Akifumi Ide, both of Kawanishi; Masakazu Nishino, Kashiwara; Tatsuro Juri, Osaka; Hideki Ohtaka, Neyagawa; Chiyoko Matsumi, Suita, all of Japan

[73] Assignee: Matsushita Electric Industrial Co., Ltd., Osaka, Japan

[21] Appl. No.: 690,253

[22] Filed: Apr. 23, 1991

[30] Foreign Application Priority Data

Apr. 27, 1990 [JP] Japan .................................. 2-113308

[51] Int. Cl.5 ...................... G11B 15/473; G11B 21/02
[52] U.S. Cl. ........................................ 360/70; 360/27; 358/319; 358/321
[58] Field of Search ............................ 360/27, 70, 69; 358/319, 321

[56] References Cited

U.S. PATENT DOCUMENTS

| | | | |
|---|---|---|---|
| 3,535,440 | 10/1970 | Watanabe et al. | 360/70 |
| 4,249,220 | 12/1981 | Yasutake et al. | 360/73 |
| 4,283,736 | 8/1981 | Morio et al. | 358/321 |
| 4,330,795 | 5/1982 | Foerster et al. | 360/70 |
| 4,514,671 | 4/1985 | Louth | 360/70 |
| 4,609,952 | 9/1986 | Yoshino et al. | 360/70 |
| 5,067,033 | 11/1991 | Wakui | 360/70 |

FOREIGN PATENT DOCUMENTS 63-23269 1/1988 Japan .

OTHER PUBLICATIONS

"An Experimental Study For A Home-Use Digital VTR"; C. Yanamitsu et al., Central Research Laboratories; Matsushita Electric Industrial Co., Ltd., Osaka, Japan, ICCE-1989.

Primary Examiner—John Zazworsky
Attorney, Agent, or Firm—Wenderoth, Lind & Ponack

[57] ABSTRACT

In a digital video signal recording/reproducing apparatus for recording digital VCR video and audio signals by using a rotary cylinder, for a video signal with a frame frequency fN of 30 Hz or 29.97 Hz, the rotating frequency of the cylinder is set to 2.5 times fN. On the other hand, for a signal with a frame frequency fP of 25 Hz, the rotating frequency of the cylinder is set to 3.0 times fP. As a result, as long as the cylinder diameters are identical, the relative speed of the tape and the head is the same for video signals of either frame frequency fN or fP.

4 Claims, 4 Drawing Sheets

DIGITAL VIDEO SIGNAL RECORDING/REPRODUCING APPARATUS

BACKGROUND OF THE INVENTION

1. Field of the Invention

The present invention relates to a digital video signal recording/reproducing apparatus for recording a digital video signal on a recording tape by using a rotary head mounted on a rotary cylinder.

2. Description of the Prior Art

In the present commercial household video tape recorders (VCRs), video signals are recorded in the mechanism as shown in FIG. 2. That is, a picture is recorded on a magnetic tape 22 wound 180 degrees on the cylinder by means of two magnetic heads 21a, and 21b mounted on a cylinder 20 rotating at the same frequency as the frame frequency of an input video signal. Therefore, when the frame frequency is changed, the rotating frequency of the cylinder is also changed. For example, in Japan and the United States, the frame frequency is 29.97 Hz (the current method) or 30 Hz (in the high definition television system). In Europe, on the other hand, the frame frequency is 25 Hz (both in the current method and the HDTV system).

Considering the manufacturing cost, the cylinder diameter should be identical in the VCRs for Japan and for Europe. The signal level of reproduced signal increases in proportion to the relative speed of the tape and head. The relative speed is nearly equal to the product of the cylinder diameter and the rotating frequency of the cylinder. Therefore, if the cylinder diameter is fixed, a larger reproduced output is obtained as the rotating frequency is increased. As a result, in the existing household, VCRs, a larger reproduced output is obtained in the VCR for Japan than in the VCR for Europe. Hence, the signal-to-noise ratio (S/N ratio) is better in the VCR for Japan than in the VCR, for Europe.

Since the existing household VCR is of analog recording system, the above-mentioned difference in S/N influences only proportionally on the difference in S/N of the reproduced picture. It is accordingly not necessary to change the compositions of the VCR for Japan and the VCR for Europe.

However, in the digital VCR (DVCR) of the next generation for digital recording, the deterioration of the S/N will deteriorate the reproduction error rate in terms of an exponential function. In the DVCR, the image is restored on the basis of the reproduced bit stream. Therefore, if the S/N deteriorates similarly, the quality of the reproduced image of the DVCR in which bit errors increase in terms of exponential function deteriorates more than in the current analog VCR. It is hence difficult to manufacture a DVCR for Japan and a DVCR for Europe in the same configuration as in the past. It is therefore necessary to equalize the reproduction S/N in the DVCR.

SUMMARY OF THE INVENTION

It is hence a first object of the invention to equalize the relative speed of tape and head in both digital video signal recording/reproducing apparatus for Japan and digital video signal recording/reproducing apparatus for Europe. It is a second object to simplify the composition for signal processing.

As the conclusion to satisfy these two objects simultaneously, the invention proposes the following.

For the signal whose frequency fN is 29.97 Hz or 30 Hz, the rotating frequency VN of the rotary cylinder is 2.5 times the frame frequency fN. Namely, VN = 2.5 × 30 Hz = 75 Hz. On the other hand, for the signal whose frame frequency fP is 25 Hz, the rotating frequency VP of the rotary cylinder is 3.0 times the frame frequency fP. Namely, VP = 3.0 × 25 Hz = 75 Hz. Therefore, if the cylinder diameters are the same, the relative speed of the tape and head is the same with respect to signals of both frame frequencies.

Incidentally, the rotating frequency of the cylinder with respect to the signal whose frame frequency is 29.97 Hz is only 0.1% smaller than 75 Hz, and the effect of the S/N by the difference in rotating frequency may be ignored.

On the other hand, in the most fundamental configuration in which two heads are mounted on a cylinder, the number of recording tracks per revolution of cylinder is two. In this invention, therefore, when the frame frequency is 29.97 Hz or 30 Hz, the number of recording tracks per frame is 2.5 × 2 = 5, and in the case of 25 Hz frame frequency, the number of recording tracks per frame is 3.0 × 2 = 6.

When one frame which is the minimum processing unit of the video signal forming one picture is completed by an number of tracks, it is very efficient for circuit processing, and it also matches with the second object of the invention. Meanwhile, the advantage of the invention is not limited to recording by two heads only.

DESCRIPTION OF THE PREFERRED EMBODIMENT

Figure 1:
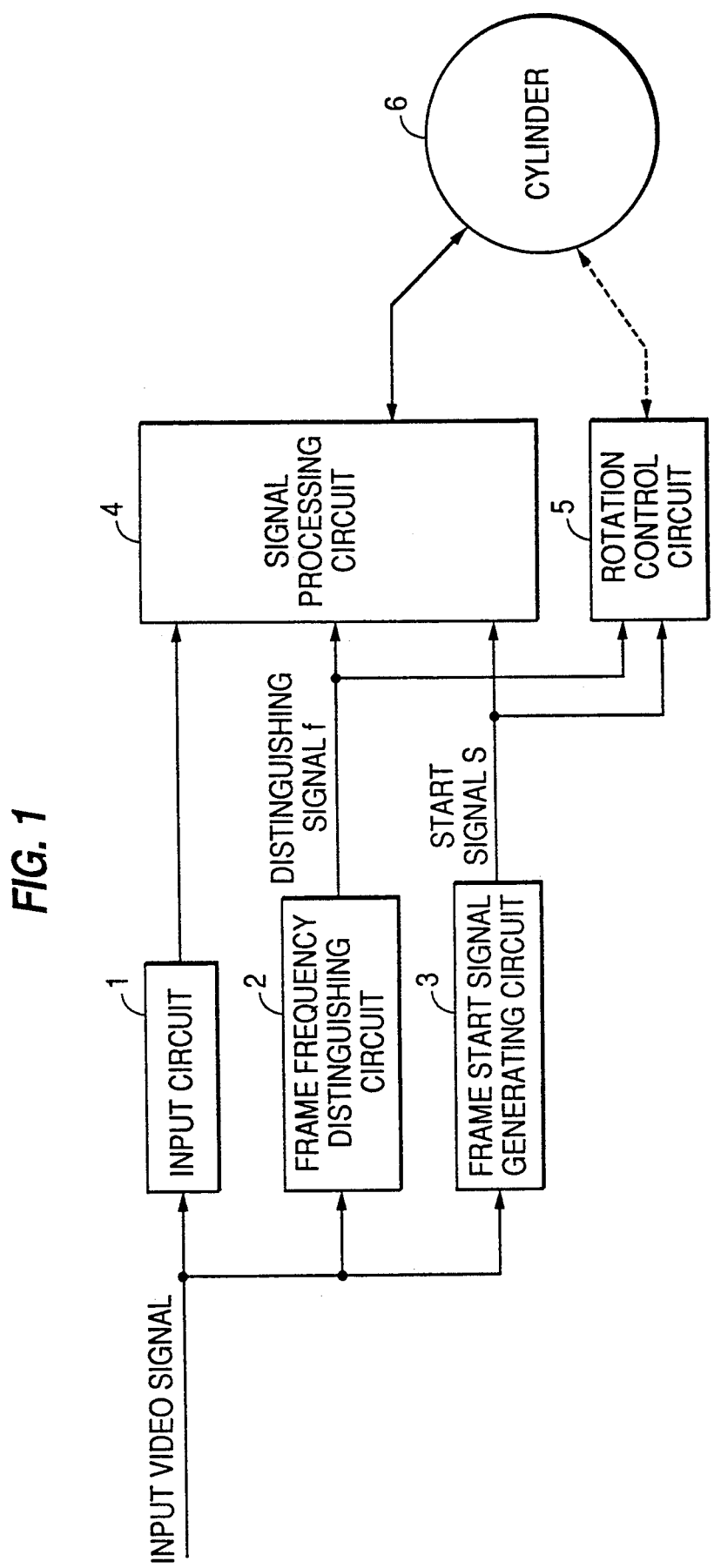
FIG. 1 is a block diagram showing a DVCR in accordance with an embodiment of the invention.

FIG. 1 shows a DVCR of an embodiment of the invention. In FIG. 1, an input circuit 1 receives a video signal to be recorded, and converts it into a digital video signal to deliver. A frame frequency distinguishing circuit 2 distinguishes the frame frequency of the input video signal and delivers a distinguishing signal f which is set to a logical "0" when the frame frequency is 29.97 Hz or 30 Hz and set to a logical "1" when the frame frequency is 25 Hz. The frame frequencies 29.97 Hz and 30 Hz may not be distinguished because the difference therebetween is very small. A frame start signal generating circuit 3 extracts a frame start signal S from the input video signal.

A signal processing circuit 4 divides the video data of one frame from the input circuit 1 into blocks so as to be recorded in five tracks, when f = "0", depending on the distinguishing signal f and frame start signal S. If the distinguishing signal f = "1", on the other hand, the video data of one frame from the input circuit 1 is divided into blocks so as to be recorded in six tracks.

A rotation control circuit 5, if the distinguishing signal f = "0", causes a cylinder 6 to be rotated at a frequency of 2.5 times the frame frequency synchronized with the frame start signal S. On the other hand, if the distinguishing signal f="1", it causes the cylinder 6 to rotate at a frequency of 3.0 times the frame frequency synchronized with the frame start signal S.

Figure 2:
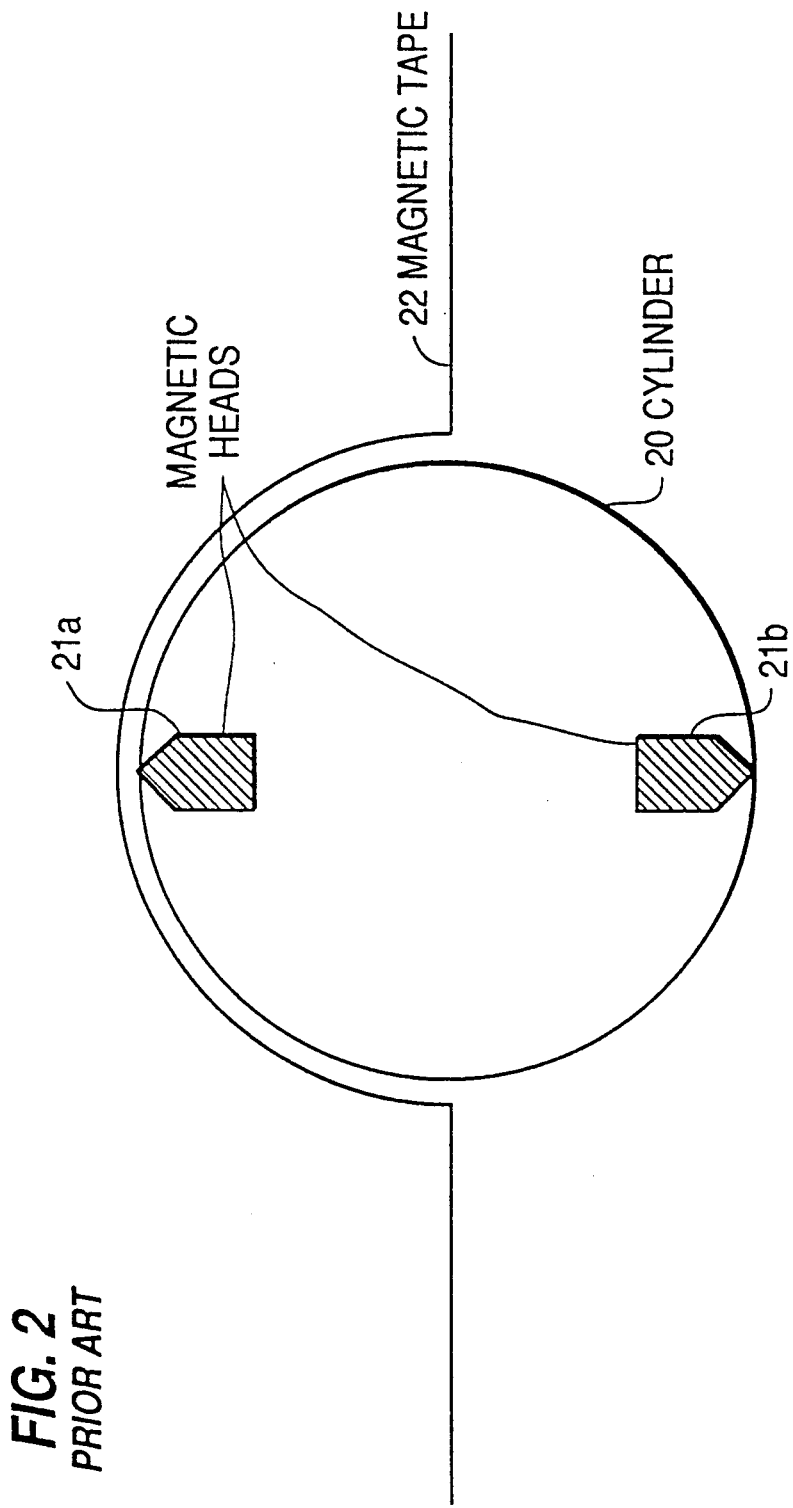
FIG. 2 is a configuration of cylinder and magnetic heads of an existing commercial household VCR.

Incidentally, for the users of general household VCRs, it seems rarely necessary to handle two types of frame frequency in one DVCR. Therefore, in the general household DVCRs the frame frequency distinguishing circuit 2 in FIG. 2 is eliminated, and depending on the local frequency, when the frame frequency is 29.97 Hz or 30 Hz, the distinguishing signal f is fixed at "0", and when the frame frequency is 25 Hz, the distinguishing signal f is fixed at "1". Even in such case, there is no problem in the commonness of other circuits and mechanisms.

Thus the signal processing circuit 4 processes either five tracks or six tracks per frame unconditionally, depending on the value of the distinguishing signal f. The rotation control circuit 5 has only to control the cylinder rotation likewise so as to rotate at either 2.5 times or 3.0 times the frame frequency. As a result, the circuit composition is further simplified.

Figure 3:
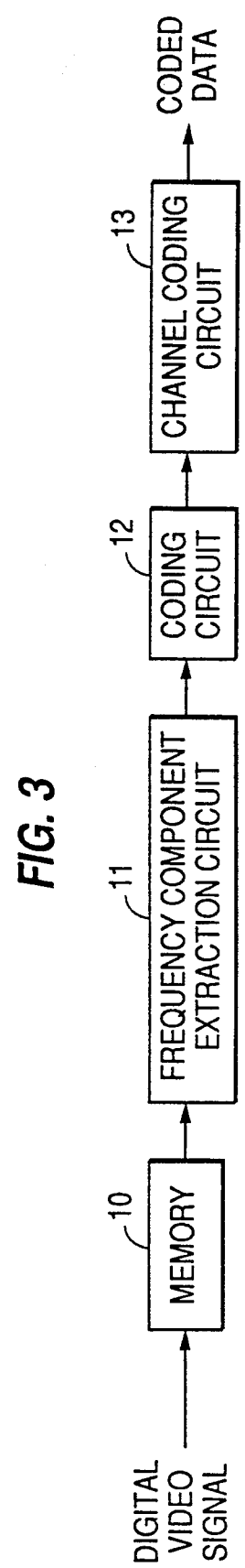
FIG. 3 is a block diagram of the signal processing circuit shown in FIG. 1.

In the signal processing circuit 4, specific processing of the DVCR is done. An example of constitution of signal processing circuit 4 is shown in FIG. 3. In FIG. 3, a memory 10 temporarily stores a luminance signal Y and two color difference signals CR and CB sent from the input circuit 1. A frequency component extraction circuit 11 extracts the frequency components of the luminance signal Y and color difference signals CR and CB read out from the memory 10. For example, the DCT method (discrete cosine transformation) is the technique suited to this frequency component extraction.

The output from the frequency component extraction circuit 11 is coded at a high frequency in a coding circuit 12. In the coding circuit 12, for example, the low frequency component to which the human vision is sensitive to is coded so as to reduce the coding distortion as much as possible. On the other hand, a relatively large distortion is allowed in coding the high frequency component to which the human vision is less sensitive to. By quantizing the low frequency component relatively finely and quantizing the high frequency component relatively coarsely, the magnitude of the distortion may be controlled. Generally, the video signal is mainly occupied by low frequency components, and the picture quality is hardly impaired by this control.

The quantized data is further efficiently coded by variable length coding. In the variable length coding, the information of high frequency having a occurrence is assigned a code word having a small number of bits, while the data having a low frequency of occurrence is assigned a long code word, and the input data is coded. In this case, if the deviation of the frequency of occurrence of input data is large, the number of bits after variable length coding may be reduced as compared with the case without deviation in the occurrence frequency. By such processing, the quantity of the data to be recorded is reduced to about 1/5, and the recording time is extended more than five times. Furthermore, there is almost no visible deterioration of picture quality.

In a channel coding circuit 13, the output of the coding circuit 12 is combined with a parity code for correcting the errors occurring during the time of reproduction. Furthermore, in order to generate the recording series possessing the characteristics matched with the characteristics of the recording and reproducing system, recording coding is conducted, and the data is recorded on a tape. When reproducing, the reverse processing of the above is done. As a result, a reproduced picture of a much higher picture quality than in the conventional VCR is obtained.

Figure 4:
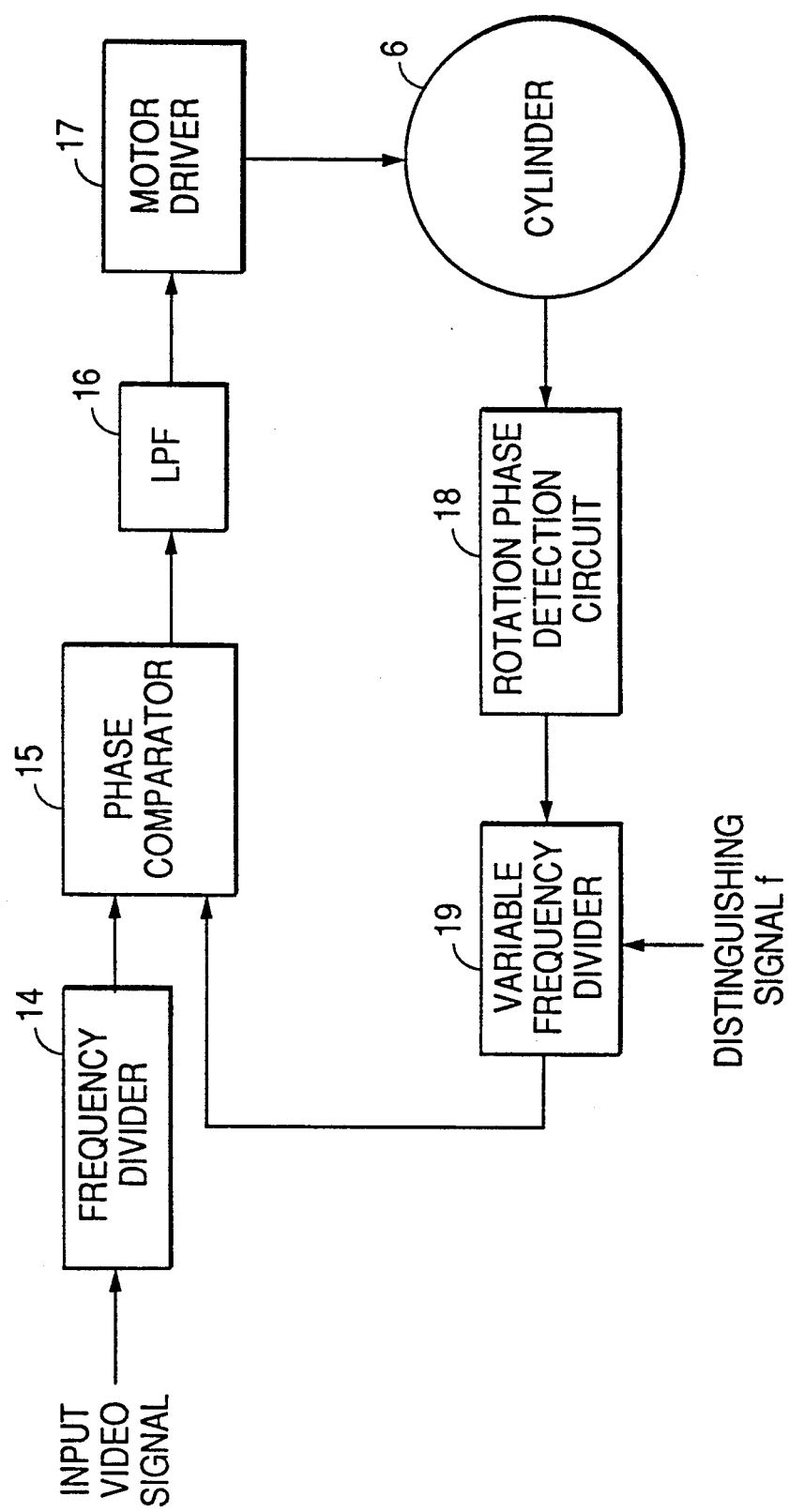
FIG. 4 is a block diagram of the rotation control circuit shown in FIG. 1.

FIG. 4 shows the constitution of the rotation control circuit 5 shown in FIG. 1. In FIG. 4, a frequency divider 14 divides the frame frequency created on the basis of the input video signal into ½. A phase comparator 15 compares the output of the frequency divider 14 and the dividing signal of 1/N (N being an integer) of the rotating frequency of the cylinder 6. When the frame frequency is 29.97 Hz or 30 Hz, N=5, and when the frame frequency is 25 Hz, N=6.

The output of the phase comparator 15 is rid of high frequency components in an LPF (low pass filter) 16, and is then sent into a motor driver 17 for rotating the cylinder 6 in which a cylinder motor (not shown) is included. The LPF 16 is used to prevent the fluctuations of high frequency due to disturbance such a noise from being transmitted to the cylinder 6. However, if the moment of inertia of the cylinder is sufficiently large, this moment of inertia plays the role of the LPF, and the LPF may not be necessary.

A rotation phase detector 18 is a circuit for generating one pulse per revolution of the cylinder 6. A variable frequency divider 19 changes over between 1/5 dividing and 1/6 dividing according to the distinguishing signal f.

In consequence, the rotating frequency of the cylinder 6 can be controlled to N/2 times (N=5 or 6) the frame frequency. FIG. 4 shows a improved circuit of the conventional phase locked loop (PLL) for this invention, and the basic principle is known. This circuit may be also realized by using a microcomputer, and the difference from the above explanation is whether hardware is used or software is used.

Thus, according to the invention, in the DVCR of identical constitution, both the signal whose frame frequency is 29.97 Hz (or 30 Hz) and the signal whose frame frequency is 25 Hz can be recorded. Therefore, in local districts differing in the frame frequency, the DVCR of the same composition will do, and it is possible to cope with only by changing over the frame frequency distinguishing signal. As a result, the cost required for the manufacture of a DVCR may be notably reduced. A DVCR deck having a frame frequency distinguishing circuit can be used in the regions of either frame frequency. The invention may be realized by a very simple circuit composition In the foregoing embodiment, meanwhile, the video data of one frame is recorded in five or six tracks, but also other signal processing for recording the images of N frames in 5×M (M being an integer) or 6×M tracks, and in this case, too, it is not necessary to modify the circuit composition in FIG. 1. Only the content of the signal processing circuit 4 is changed.

Moreover, the invention may be applied not only to the current television system, but also to the high definition television system. In the case of high definition television system, the number of data sets per frame is increased from the number of data set in the existing system. Therefore, the constitution of the signal processing circuit 4 may be modified so as to record the high definition images of one frame in 10×M tracks or 12×M tracks by using M pairs of magnetic heads on the cylinder.

These modifications may be done easily in the ordinary circuit technology, and will not spoil the effects of the invention. In other words, according to the present invention, images of the current system at a frame frequency of 29.97 Hz or 25 Hz, and images of the high definition system at a frame frequency of 30 Hz or 25 Hz can be all recorded by only one DVCR.

What is claimed is:

1. A digital video signal recording/reproducing apparatus comprising:
    a rotary cylinder for winding thereon a recording tape over a specific winding angle with respect to a rotation axis of said rotary cylinder;
    a signal processing circuit for converting an input video signal to digital coded data;
    a head mounted on said rotary cylinder for recording output data from said signal processing circuit on said recording tape and for reproducing the recorded data from said recording tape;
    a control signal producing circuit for producing a control signal which has a first value when a frame frequency of said input video signal is one of 29.97 Hz and 30 Hz and a second value when said frame frequency is 25 Hz; and
    a cylinder control circuit response to said control signal for controlling said rotary cylinder so as to rotate at a frequency 2.5 times said frame frequency when said frame frequency is one of 29.97 Hz and 30 Hz and at a frequency 3 times said frame frequency when said frame frequency is 25 Hz.

2. An apparatus according to claim 1, wherein said control signal producing circuit comprises a frame frequency detecting circuit for detecting a frame frequency of said input video signal to produce said control signal.

3. An apparatus according to claim 1, wherein said control signal producing circuit is arranged to produce a fixed value which is one of either said first value and said second value.

4. A method of recording/reproducing a digital video signal on/from a recording tape wound on a rotary cylinder at a specific angle via a recording head mounted on said rotary cylinder, characterized by rotating said rotary cylinder at a frequency 2.5 times a frame frequency of a video signal when said frame frequency is one of 29.97 Hz and 30 Hz and at a frequency 3 times said frame frequency when said frame frequency is 25 Hz.

* * * * *